(12) United States Patent
Tohoda et al.

(10) Patent No.: US 9,413,206 B2
(45) Date of Patent: Aug. 9, 2016

(54) COGENERATION APPARATUS

(71) Applicant: HONDA MOTOR CO., LTD., Minato-Ku, Tokyo (JP)

(72) Inventors: Toshiaki Tohoda, Wako (JP); Koichi Tsuno, Wako (JP); Koichi Oka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 128 days.

(21) Appl. No.: 14/049,314

(22) Filed: Oct. 9, 2013

(65) Prior Publication Data
US 2014/0103649 A1 Apr. 17, 2014

(30) Foreign Application Priority Data
Oct. 16, 2012 (JP) .................................. 2012-228742

(51) Int. Cl.
*H02K 9/00* (2006.01)
*F24D 11/00* (2006.01)
*F24D 19/10* (2006.01)

(52) U.S. Cl.
CPC ............... *H02K 9/005* (2013.01); *F24D 11/005* (2013.01); *F24D 19/1012* (2013.01); *F24D 2200/26* (2013.01); *F24H 2240/06* (2013.01); *Y02B 30/745* (2013.01); *Y02E 20/14* (2013.01)

(58) Field of Classification Search
CPC ............... F24D 11/005; F24D 19/1012; F24D 2200/26; H02K 9/005; Y02B 30/745; Y02E 20/14
USPC .............................................................. 290/2
See application file for complete search history.

(56) References Cited

U.S. PATENT DOCUMENTS

| | | | | |
|---|---|---|---|---|
| 4,269,030 A | * | 5/1981 | Osborne | 60/641.1 |
| 6,318,089 B1 | * | 11/2001 | Hiraga et al. | 60/728 |
| 7,983,541 B2 | * | 7/2011 | Clements | 392/471 |
| 8,093,733 B2 | * | 1/2012 | Yuri | 290/2 |
| 8,169,092 B2 | * | 5/2012 | Yamamura et al. | 290/2 |
| 8,354,755 B2 | * | 1/2013 | Yuri | 290/2 |
| 2005/0183421 A1 | * | 8/2005 | Vaynberg et al. | 60/641.8 |

(Continued)

FOREIGN PATENT DOCUMENTS

| | | |
|---|---|---|
| EP | 1 273 785 A2 | 1/2003 |
| JP | H10-9054 A | 1/1998 |
| JP | 2002-277053 A | 9/2002 |

OTHER PUBLICATIONS

Extended European search report issued in the corresponding European patent application 13187904.1.

*Primary Examiner* — Tulsidas C Patel
*Assistant Examiner* — Viet Nguyen
(74) *Attorney, Agent, or Firm* — Carrier Blackman & Associates, P.C.; Joseph P. Carrier; Jeffrey T. Gedeon

(57) ABSTRACT

In a cogeneration apparatus having a power generation unit equipped with a power generator, an internal combustion engine, and a hot water tank connected to the engine through a heat exchanger, there are provided a first pump provided at a flow channel connecting the engine to the heat exchanger and a second pump provided at a second flow channel connecting the heat exchanger to the hot water tank. A temperature of the engine cooling water heated by the engine and a temperature difference between the temperature and a temperature of the engine cooling water cooled by the heat exchanger is determined and based on the determined values, flow rates of the first and second pumps are controlled.

8 Claims, 6 Drawing Sheets

(56) References Cited

U.S. PATENT DOCUMENTS

| | | | |
|---|---|---|---|
| 2008/0061158 A1* | 3/2008 | Nakagawa et al. | 237/12.1 |
| 2008/0229782 A1* | 9/2008 | Takegami et al. | 62/513 |
| 2009/0107129 A1* | 4/2009 | Yuri et al. | 60/320 |
| 2009/0295158 A1* | 12/2009 | Yuri | 290/2 |
| 2009/0320503 A1* | 12/2009 | Kamiya | 62/79 |
| 2010/0183934 A1* | 7/2010 | Yukimasa et al. | 429/437 |
| 2011/0030673 A1* | 2/2011 | Kanai | 126/587 |

* cited by examiner

COGENERATION APPARATUS

BACKGROUND OF THE INVENTION

1. Field of the Invention

An embodiment of this invention relates to a cogeneration apparatus, particularly to a cogeneration apparatus having a power generation unit equipped with a power generator and an internal combustion engine connected to the generator and to a hot water tank through a heat exchanger.

2. Description of the Related Art

In recent years, cogeneration apparatuses for household use have been developed each equipped with an engine-driven generator connected to an AC power supply line between a commercial power source and an electric load for supplying power to the load in interconnection with the commercial power source and also for supplying hot water or air heated by the engine exhaust to a thermal load, including one taught, for example, by Japanese Laid-Open Patent Application No. 2002-277053.

The cogeneration apparatus mentioned in the reference has a power generation unit equipped with an internal combustion engine connected to a power generator and to a hot water tank through a heat exchanger, a pump located at a flow channel connecting the hot water tank and the heat exchanger to supply heated tap water to the tank, and a controller for controlling operation of the pump in accordance with a temperature of the tap water retained in the tank.

SUMMARY OF THE INVENTION

In the engine of the cogeneration apparatus, engine oil (lubricant oil) is used to protect moving parts from wear and tear. Since temperature of the engine oil influences on the service life of the oil itself and engine, the engine oil temperature should preferably be regulated within a range and hence, in the cogeneration apparatus like that mentioned in the reference, the pump is also used to circulate the engine cooling water in such a way that the temperature of the engine oil is kept within a proper range.

However, since the pump is operated to circulate the engine cooling water at a constant flow rate to keep the temperature within the proper range in the cogeneration apparatus, when a part or constituent of the apparatus such as a boiler, hot water tank, etc., is to be changed for some reasons, it becomes difficult to keep the engine cooling water temperature within the proper range by the pump operation of a constant flow rate. The flow rate should disadvantageously be reset from the first.

An object of the embodiment of this invention is therefore to overcome the foregoing disadvantage by providing a cogeneration apparatus that enables to keep the engine cooling water temperature within the proper range without resetting the pump flow rate when its part of constituent is to be changed.

In order to achieve the object, this invention provides in its first aspect a cogeneration apparatus having a power generation unit equipped with a power generator adapted to be connected to an AC power feed line at a location between a commercial power network and an electric load, and an internal combustion engine adapted to drive the generator, and a hot water tank connected to the engine through a heat exchanger, comprising: a first pump provided at a first flow channel connecting the engine to the heat exchanger, and adapted to force an engine cooling water heated by the engine to flow to the heat exchanger and to force the engine cooling water cooled by the heat exchanger to flow to the engine through the first flow channel; a first temperature sensor adapted to produce an output indicative of a temperature of the engine cooling water heated by the engine; and a controller adapted to control a flow rate of the first pump based on the detected temperature of the engine cooling water detected by the first temperature sensor.

In order to achieve the object, this invention provides in its second aspect a method for controlling operating a cogeneration apparatus having a power generation unit equipped with a power generator adapted to be connected to an AC power feed line at a location between a commercial power network and an electric load, an internal combustion engine adapted to drive the generator, a hot water tank connected to the engine through a heat exchanger, a first pump provided at a flow channel connecting the engine to the heat exchanger and adapted to force an engine cooling water heated by the engine to flow to the heat exchanger, and to force the engine cooling water cooled by the heat exchanger to flow to the engine; comprising the steps of: detecting a first temperature of the engine cooling water heated by the engine; and controlling a flow rate of the first pump based on the detected first temperature of the engine cooling water.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A cogeneration apparatus according to an embodiment of the invention will now be explained with reference to the attached drawings.

Figure 1:
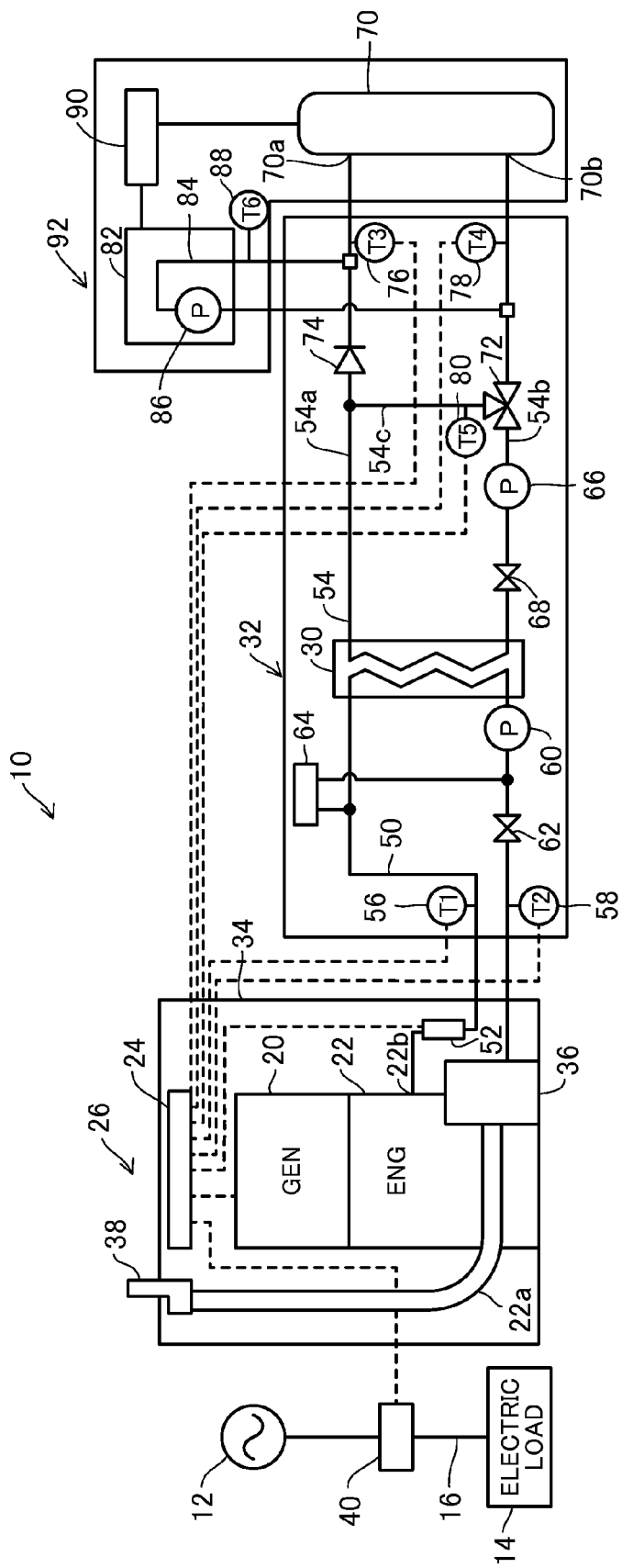
FIG. 1 is a block diagram giving an overall view of a cogeneration apparatus according to the embodiment of this invention.

FIG. 1 is a block diagram giving an overall view of a cogeneration apparatus according to the embodiment of this invention.

In FIG. 1, reference numeral 10 designates the cogeneration apparatus. The cogeneration apparatus 10 is equipped with a power generation unit 26 having a power generator (GEN) 20 constituted of multi-polar coils and connectable to an AC power feed line (power line) 16 between a commercial power source (commercial power network) 12 and an electric load (precisely, a lighting fixture, etc.) 14, an internal combustion engine (ENG; hereinafter called "engine") 22 for driving the power generator 20 and a power generation controller 24.

The cogeneration apparatus 10 is further equipped with a heat exchange unit 32 including a heat exchanger 30 adapted to exchange heat with a cooling water of the engine 22.

The commercial power source 12 outputs or generates single-phase, three-wire, 100/200 V, 50 Hz (or 60 Hz) AC (alternating current) power. The power generation unit 26 is integrally built and housed inside a power generation unit case 34.

The engine 22 is a single-cylinder, four-cycle, water-cooled, spark-ignition, OHV engine that runs on the city gas or LP (liquefied petroleum) gas and has a displacement of, for example, 163 cc. Although not shown in the drawing, the cylinder head and cylinder block of the engine 22 are laid in the lateral (horizontal) direction in the case 34, and a piston is accommodated in the cylinder to reciprocate.

Air sucked from an air intake duct is mixed with gas supplied from a gas supply source, and the air-fuel mixture thus produced flows into a combustion chamber and burns upon ignition by an ignition plug (not shown) to drive the piston, thereby rotating the crankshaft connected to the piston about a longitudinal (vertical) direction in the case 34.

The generated exhaust gas exchanges heat with the engine cooling water (comprising an anti-freezing solution) at an exhaust heat exchanger 36 to cool the water. Specifically, the exhaust heat exchanger 36 comprises a flow passage formed to run through a heating region such as the cylinder block of the engine 22. The exhaust gas is then discharged to the exterior of the case 34 through an exhaust pipe 22a and a muffler 38.

The power generator 20 constituted as the multi-polar coils is fastened on the crankcase of the engine 22 at a location within a flywheel (not shown) attached to the upper end of the crankshaft. The flywheel is fixed with magnet pieces at its inner surface. The power generator 20 produces AC, when rotating relatively to the flywheel, whose amount depends on a rotational speed of the engine 22. The output of the power generator 20 is sent to the power generation controller 24.

Although not shown in the drawing, the power generation controller 24 comprises an electronic control unit (ECU) that comprises a microcomputer, an inverter and a DC/DC converter. The inverter inverts the output of the power generator 20 to 100/200 V AC power (single phase) through the DC/DC converter. The output of the inverter is supplied to a switch board 40 (interposed between the commercial power source 12 and the electric load 14) and is further supplied to the electric load 14, while interconnecting with the commercial power source 12.

The power generator 20 functions as a starter motor for cranking the engine 22, when supplied with power from the commercial power source 12 via the inverter. The power generation controller 24 switches the function of the power generator 20 between the starter and the power generator 20, and controls operation of the engine 22 and the like.

The engine cooling water (circulated between the engine 22 and exhaust heat exchanger 36) is heated by hot portions like the cylinder block of the engine 22, while cooling the engine 22, and is further heated by the exhaust gas at the exhaust heat exchanger 36. A part of the engine cooling water is supplied to the heat exchange unit 32 through a primary (first) flow channel 50.

The primary flow channel 50 comprises a pipe and connects the engine 22, a heat exchanger 30 and the exhaust heat-exchanger 36. Specifically, the channel 50 is connected to a cooling water outlet 22b at one end and is connected to the exhaust heat exchanger 36 at the other end. The heated engine cooling water flows in the channel 50 from the outlet 22b and flows to the exhaust heat exchanger 36 through the heat exchanger 30.

The heat exchanger 30 is connected with a secondary (second) flow channel 54. A tap water flows the secondary flow channel 54 and is heated at the heat exchanger 30 by the heat exchange with the heated engine cooling water sent from the primary flow channel 50.

More specifically, the primary flow channel 50 and secondary flow channel 54 are partially made close to each other at the heat exchanger 30 such that the engine cooling water flowing the channel 50 is cooled while the tap water flowing the channel 54 is heated. The cooled engine cooling water flowing the channel 50 is supplied to the exhaust heat exchanger 36 where it is again heated.

An electric heater 52 is provided at the channel 50 at a location downstream of the outlet 22b. The electric heater 52 is supplied with current to heat the water flowing the channel 50 when a surplus power is generated at the power generation unit 26. The terms "downstream" (and "upstream") mean those in the direction of water flow.

A first pump 60 is provided at the primary flow channel 50 to force the engine cooling water to circulate there. The pump 60 is installed at a location between the heat exchanger 30 and the exhaust heat exchanger 36. The pump 60 pumps the engine cooling water cooled at the heat exchanger 30 and discharges it to the exhaust heat exchanger 36. Thus, the engine cooling water heated by the engine 22 and outputted from the outlet 22b is supplied to the heat exchanger 30 to be cooled, and is returned to the exhaust heat exchanger 36, i.e., the engine 22 by the pump 60.

An air release valve 62 is provided at the primary flow channel 50 at a location downstream of the pump 60 to release air mixed in the water through the pump 60. A reservoir tank 64 is connected to the primary flow channel 50 at locations upstream and downstream of the heat exchanger 30 to regulate a pressure of the engine cooling water circulating the channel 50.

In the channel 50, a first temperature sensor 56 is provided at a location upstream of the heat exchanger 30 and produces an output or signal indicative of a temperature of the engine cooling water T1 outputted from the outlet 22b, and a second temperature sensor 58 is provided at a location downstream of the pump 60 and produces an output or signal indicative of a temperature of the engine cooling water T2 cooled by the heat exchanger 30 and to be returned to the exhaust heat exchanger 36.

The secondary flow channel 54 comprises a pipe and connects the heat exchanger 30 to a hot water tank 70.

Specifically, the channel 54 comprises a first channel portion 54a that connects the heat exchanger 30 to a tank inlet 70a and supplies the tap water heated by the heat exchanger 30 to the tank 70, a second channel portion 54b that connects a tank outlet 70b (at a position low in the direction of gravity) to the heat exchanger 30 and supplies the tap water outputted from the tank 70 to the heat exchanger 30, and a third channel portion 54c that bypasses the heat exchanger 30 to connect the first channel portion 70a to the second channel portion 70b directly.

The tank 70 is surrounded its outer wall by a heat insulator and contains tap water inside. The tank 70 has an inlet port (not shown) connected to a tap and an outlet port connected to a thermal load such as hot water equipment of a kitchen and bathroom.

A second pump 66 is provided at the secondary flow channel 54 to force the tap water to circulate the heat exchanger 30 and the hot water tank 70. The pump 66 is installed at the second channel portion 54b of the secondary flow channel 54 at a location between the tank outlet 70b and the heat exchanger 30.

The pump 66 pumps the tap water from the tank 70, discharges it to the heat exchanger 30 and returns it to the tank 70. An air-release valve 68 is similarly provided at the secondary flow channel 54 at a location downstream of the pump 66 to release air mixed in the water through the pump 66.

A flow switching valve 72 is installed at a junction of the second and third channel portions 54b and 54c to switch a direction of flow of the tap water. Specifically, the flow switching valve 72 comprises a three-way valve whose valve member can be switched to a first position in which the portion 54c is connected to the downstream (relative to the junction and left in the figure) of the portion 54b and a second position in which the upstream (relative to the junction and right in the figure) of the portion 54b is connected to the downstream of the portion 54b.

A check valve 74 is installed at the first channel portion 54a at a location downstream of a connecting point (where the portion 54a is connected to the portion 54c) to prevent the tap water from flowing reverse.

A third temperature sensor 76 is installed at the first channel portion 54a at a location most downstream side thereof, more precisely at a location downstream of the check valve 74 and relatively close to the tank inlet 70a, and produces an output or signal indicative of a temperature of the tap water T3 to be supplied to the hot water tank 70.

A fourth temperature sensor 78 is installed at the second channel portion 54b at a location most upstream side thereof, i.e., at a location relatively near to the outlet 70b, and produces an output or signal indicative of a temperature of the tap water T4 outputted from the hot water tank 70.

A fifth temperature sensor 80 is installed at the third channel portion 54c and produces an output or signal indicative of a temperature of the tap water T5 flowing the portion 54c.

With this, as will be mentioned below, the flow switching valve 72 is switched based on the temperature T5 detected by the sensor 80 in such a manner that it is switched to the first position when the detected temperature T5 is equal to or smaller than a predetermined temperature, while it is switched to the second position when the detected temperature T5 is greater than the predetermined temperature.

As a result, the tap water circulates the portion 54a, portion 54c and portion 54b (without flowing in the tank 70) when the temperature T5 is equal to or smaller than the predetermined temperature, but flows in the tank 70 through the portion 54a when the temperature T5 is greater than the predetermined temperature.

A boiler 82 is connected to the secondary flow channel 54. The boiler 82 is connected to a gas supply source (not shown) and, burns gas supplied from the supply source to heat the tap water flowing a boiler circulation channel 84.

The boiler circulation channel 84 is connected to the first channel portion 54a at a location between the check valve 74 and a connecting point of the third temperature sensor 76 at one end and is connected to the second channel portion 54b at a location between the flow switching valve 72 and a connecting point of the fourth temperature sensor 78 at the other end, so that the tap water heated by the boiler 82 circulates the hot water tank 70 and the boiler 82.

A third pump 86 is provided at the boiler circulation channel 84 to circulate the tap water. A sixth temperature sensor 88 is provided at the boiler circulation channel 84 and produces an output or signal indicative of a temperature of the tap water T6.

A boiler controller 90, similarly comprising an electronic control unit (ECU) constituted as a microcomputer is provided to control operation of the boiler 82. The boiler controller 90 controls start and stop of the boiler 82 and the pump 86 based on the temperature T6 detected by the temperature sensor 88.

The boiler 82, the boiler controller 90 and the hot water tank 70 form a boiler unit 92.

The operation of the cogeneration apparatus 10 will be explained.

Figure 2:
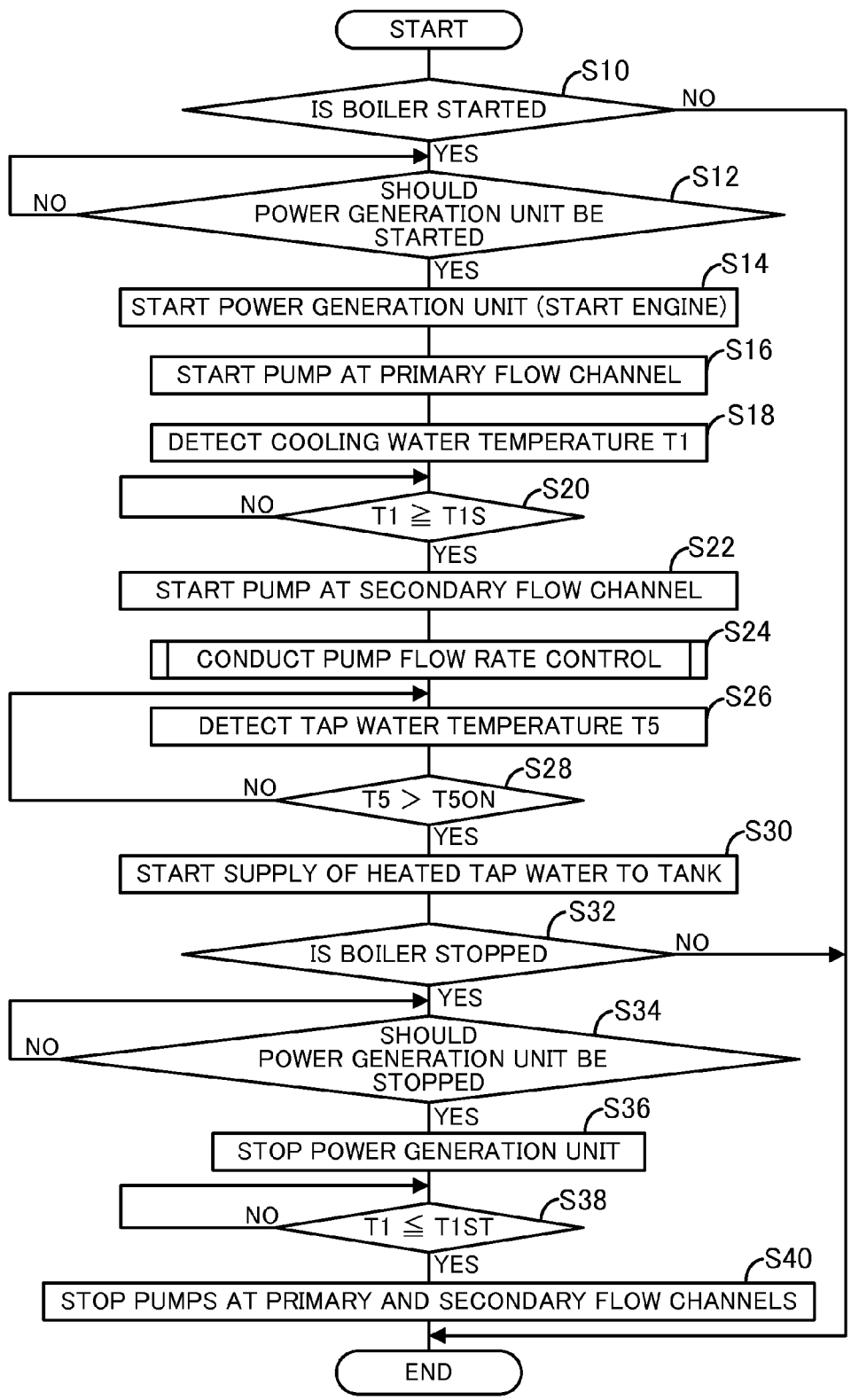
FIG. 2 is a flowchart showing the operation of an ECU of the power generation controller illustrated in FIG. 1.

FIG. 2 is a flowchart showing the operation of the ECU of the power generation controller 24. The illustrated program is executed at predetermined intervals.

The program begins in S10, in which it is determined whether the boiler 82 is started (more precisely, the operation of the boiler 82 is started). This is done based on a change of the tap water temperature T3 detected by the temperature sensor 76. When the result is negative, the program is immediately terminated.

On the other hand, when the result is affirmative, the program proceeds to S12, in which it is determined whether the power generation unit 26 should be started (more precisely, the operation of the unit 26 should be started). This is done based on a change of the tap water temperature T3 detected by the temperature sensor 76 and the tap water temperature T4 detected by the temperature sensor 78.

When the result is negative, the processing is suspended until the result becomes affirmative and when it does, the program proceeds to S14, in which the engine 22 is started and the power generation unit 26 is started, and to S16, in which, since the operation of the generation unit 26 is started, the pump 60 at the primary flow channel 50 is started to circulate the engine cooling water to the primary flow channel 50.

At starting the operation of the power generation unit 26, a flow rate of the pump 60 is set to be a rated minimum flow rate. The reason is to raise an engine oil temperature to an optimum level as early as possible and to shorten a warm up time period of the engine 22. The rated minimum flow rate is set to be a value (obtained through experimentation) so as the engine cooling water not to boil.

The program proceeds to S18, in which the engine cooling water temperature T1 is detected by the temperature sensor 56, and to S20, in which it is determined whether the detected temperature T1 is equal to or greater than a predetermined temperature T1S. The predetermined temperature T1S is set to be a value corresponding to a difference (e.g., 72° C.) obtained by subtracting a tolerance (e.g., 3° C.) from a desired temperature of the engine cooling water (e.g., 75° C.), for example.

When the result in S20 is negative, the processing is suspended until the result becomes affirmative and when it does, the program proceeds to S22, in which the pump 66 at the secondary flow channel 54 is started. The heat exchange in the heat exchanger 30 is started when the engine cooling water and the tap water are circulated by the pumps 60, 66.

The program then proceeds to S24, in which flow rate control is conducted for the first and second pumps 60, 66. Specifically, upon starting of the second pump 66 and initiation of the heat exchange, flow rates of the pumps 60, 66 are controlled.

Figure 3:
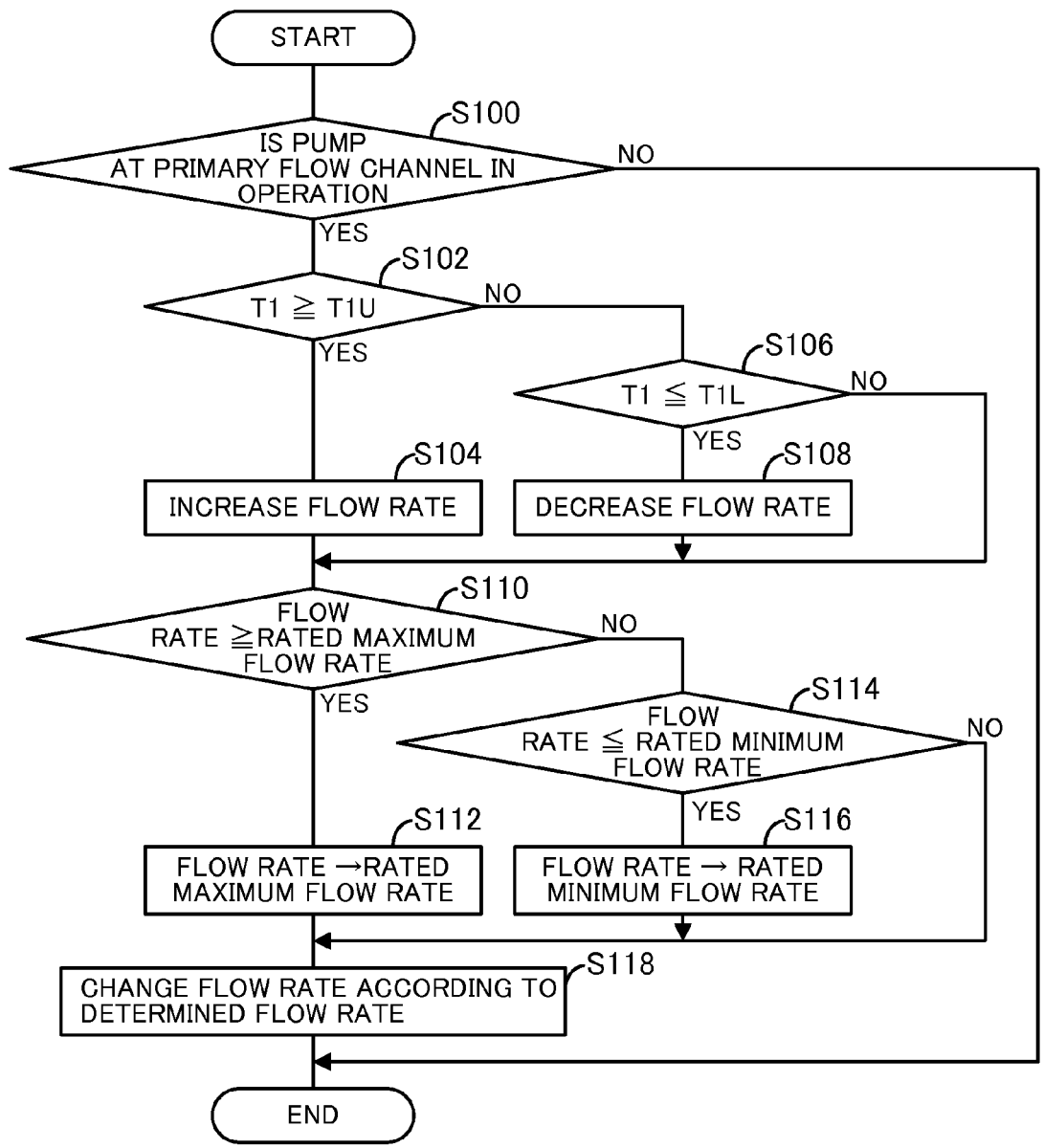
FIG. 3 is a subroutine flowchart of the FIG. 2 flowchart showing a pump flow rate control referred to in the FIG. 2 flowchart.
Figure 4:
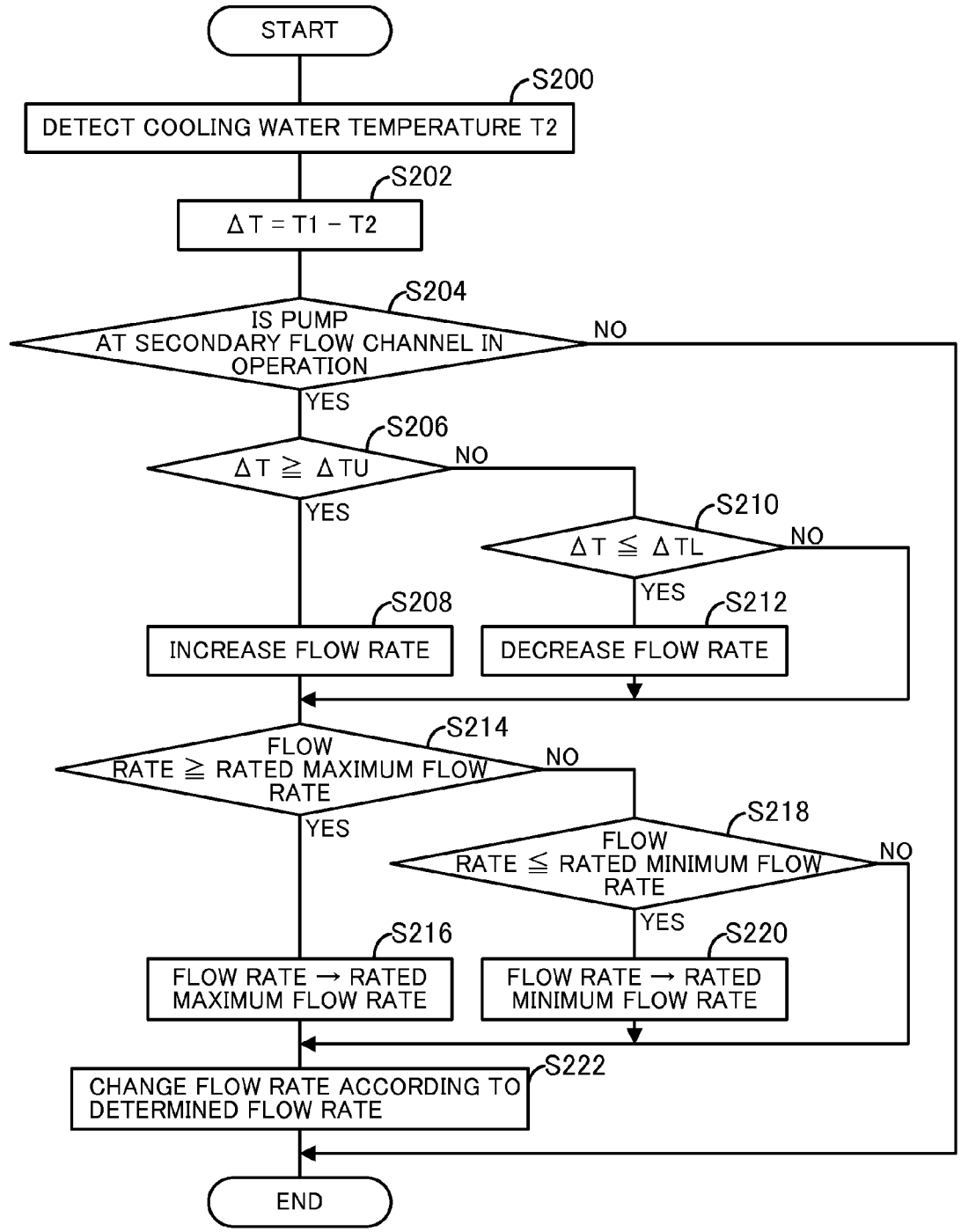
FIG. 4 is a subroutine flowchart of the FIG. 2 flowchart similarly showing a pump flow rate control referred to in the FIG. 2 flowchart.

FIG. 3 is a subroutine flowchart of the FIG. 2 flowchart showing the flow rate control for the first pump 60, and FIG. 4 is a subroutine flowchart of the FIG. 2 flowchart similarly showing the flow rate control for the second pump 66.

Explaining the processing in the flowchart of FIG. 3 first, the program begins in S100, in which it is determined whether the pump 60 at the primary flow channel 50 is in operation. When the result is negative, the program is immediately terminated.

When the result is affirmative, on the other hand, the program proceeds to S102, in which it is determined whether the temperature of the engine cooling water T1 is equal to or greater than a predetermined (second) temperature T1U.

When the result in S102 is affirmative, the program proceeds to S104, in which the flow rate of the pump 60 is added by a unit increase amount to be increased. On the other hand, when the result in S102 is negative, the program proceeds to S106, in which it is determined whether the temperature of the engine cooling water T1 is equal to or smaller than a predetermined (first) temperature T1L.

When the result in S106 is affirmative, the program proceeds to S108, in which the flow rate of the pump 60 is subtracted by a unit decrease amount to be decreased. When the result in S106 is negative, the program skips the processing in S108.

The unit increase amount and decrease amount may be equal to or different from each other. The processing from S102 to S108 is to determine the flow rate of the pump 60 and change of the flow rate will be made at a later step.

The predetermined temperatures T1U, T1L will be explained.

Figure 5:
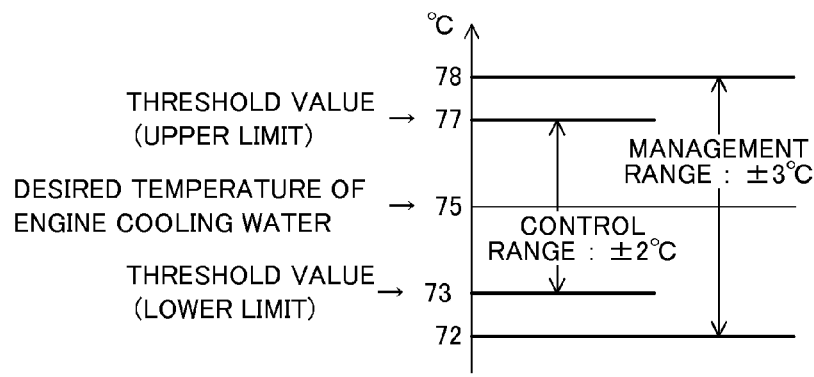
FIG. 5 is an explanatory view showing a desired temperature of the engine cooling water to be controlled in the FIG. 3 flowchart.

FIG. 5 is an explanatory view showing a desired temperature of the engine cooling water to be controlled in the FIG. 3 flowchart.

As illustrated, in the embodiment, the desired temperature of the engine cooling water is set at 75° C. and assuming the tolerance as 3° C., a temperature management range is set to 72° C. to 78° C. In order to make the temperature T1 within the temperature management range, the temperature T1 is to be controlled in the control range obtained by the desired temperature 75° C. plus/minus 2° C., i.e., from the predetermined temperature T1L (73° C.) to the predetermined temperature T1U (77° C.).

Consequently, when the detected temperature T1 is equal to or greater than T1U (77° C.), the pump flow rate is controlled to be increased (S102, S104), while the detected temperature T1 is equal to or smaller than T1L (73° C.), it is controlled to be decreased (S106, S108).

Returning to the explanation of the FIG. 3 flowchart, the program then proceeds to S110, in which it is determined whether the calculated flow rate of the pump 60 is equal to or greater than a rated maximum flow rate and when the result is affirmative, and to S112, in which the flow rate of the pump 60 is set to the rated maximum flow rate.

On the other hand, when the result in S110 is negative, the program proceeds to S114, in which it is determined whether the calculated flow rate of the pump 60 is equal to or smaller than the rated minimum flow rate. When the result in S114 is affirmative, the program proceeds to S116, in which the flow rate of the pump 60 is set to be the rated minimum flow rate. When the result in S114 is negative, the program skips the processing in S116.

The processing in S110 to S116 is to limit the calculated flow rate of the pump 60 within the range of the rated flow rates.

The pump 60 is a type of the pump whose flow rate is changed by varying an amount of DC voltage. A DC voltage range useable to change the flow rate is from 1.0 V to 5.0 V. The pump 60 is configured to discharge the engine cooling water at the rated minimum flow rate when supplied with DC voltage of 1.0 V, while it is configured to discharge the water at the rated maximum flow rate when supplied with DC voltage of 5.0 V. The flow rate of the pump 60 can thus be controlled by increasing/decreasing the amount of DC voltage to be supplied to it.

In the flowchart, the program then proceeds to S118, in which the pump 60 is operated by the determined flow rate.

Next, explaining the processing in the flowchart of FIG. 4 concerning the flow rate control of the pump 66 provided at the secondary flow channel 54, the program begins in S200, in which the temperature of the engine cooling water T2 is detected from the output of the temperature sensor 58, and proceeds to S202, in which a temperature difference ΔT between the temperature of the engine cooling water temperatures T1 detected in S18 of the FIG. 2 flowchart and the temperature of the engine cooling water T2 just detected in S200 is calculated.

The program then proceeds to S204, in which it is determined whether the pump 66 at the secondary flow channel 54b is in operation. When the result is negative, the program is immediately terminated.

On the other hand, when the result is affirmative, the program proceeds to S206, in which it is determined whether the temperature difference ΔT is equal to or greater than a predetermined (fourth) temperature ΔTU. When the result in S206 is affirmative, the program proceeds to S208, in which the flow rate of the pump 66 is added by a unit increase amount to be increased.

On the other hand, when the result in S206 is negative, the program proceeds to S210, in which it is determined whether the temperature difference ΔT is equal to or smaller than a predetermined (third) temperature ΔTL. When the result in S210 is affirmative, the program proceeds to S212, in which the flow rate of the pump 66 is subtracted by a unit decrease amount to be decreased. When the result in S210 is negative, the program skips the processing in S212.

Like the processing in the FIG. 3 flowchart, the unit increase amount and decrease amount in S208, S212 may be equal to or different from each other.

Explaining the predetermined temperature ΔTU and ΔTL, the pump 66 can contribute to temperature management of the engine cooling water as it regulates a quantity of heat exchanged at the heat exchanger 30. Accordingly, in the embodiment, a quantity of heat exchanged at the heat exchanger 30 is estimated by the temperature difference ΔT between the temperatures T1 and T2 of the engine cooling water, and the temperature is controlled such that ΔT becomes equal to a target value. In the embodiment, the target value of ΔT is set to be 7.5° C., the predetermined temperature ΔTU set to be 8° C., and the predetermined temperature ΔTL is set to be 7° C.

In the flowchart, the program then proceeds to S214, in which it is determined whether the calculated flow rate of the pump 66 is equal to or greater than the rated maximum flow rate and when the result is affirmative, and to S216, in which the flow rate of the pump 66 is set to the rated maximum flow rate.

On the other hand, when the result in S214 is negative, the program proceeds to S218, in which it is determined whether the calculated flow rate of the pump 66 is equal to or smaller than the rated minimum flow rate. When the result in S218 is affirmative, the program proceeds to S220, in which the flow rate of the pump 66 is set to be the rated minimum flow rate. When the result in S218 is negative, the program skips the processing in S220.

Also, the processing in S214 to S220 is to limit the calculated flow rate of the pump 66 within the range of the rated flow rates.

The program then proceeds to S222, in which the pump 66 is operated by the determined flow rate.

Figure 6:
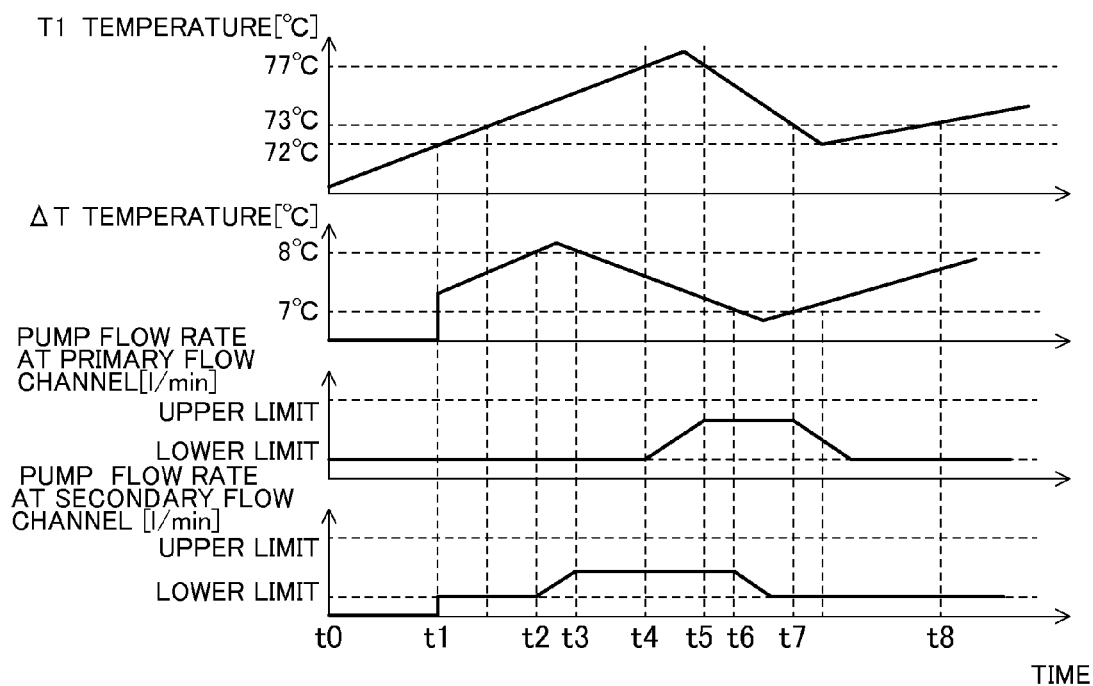
FIG. 6 is a time chart showing the processing in the flowcharts of FIGS. 2 to 4.

FIG. 6 is a time chart showing the processing in the flowcharts of FIGS. 2 to 4.

In the figure, the flow rate of the pump 60 at the primary flow channel 50 is shown as "PUMP FLOW RATE AT PRIMARY FLOW CHANNEL" and that of the pump 66 at the secondary flow channel 54 is shown as "PUMP FLOW RATE AT SECONDARY FLOW CHANNEL".

In the processing, since the temperature of the engine cooling water T1 becomes equal to or greater than 72° C. (value obtained by subtracting the tolerance 3° C. from the desired temperature of the engine cooling water 75° C.; the predetermined temperature T1S) at time t1, the pump 66 at the secondary flow channel 54 is started (S20, S22).

Since the pump 60 has been operated from the first (t0), in response to the dual pump operation achieved by the starting of the pump 66, the calculation of the temperature difference ΔT between the temperatures T1 and T2 of the engine cooling water is started at that time (t1) (S202).

Then, since the temperature difference ΔT becomes equal to or greater than the predetermined temperature 8° C. (ΔTU) at time t2, the flow rate of the pump 66 is started to be increased, and the increase is continued until time t3 at which the temperature difference ΔT becomes smaller than the predetermined temperature 8° C. (ΔTU) (S206, S208).

Then, since the temperature of the engine cooling water T1 becomes equal to or greater than the predetermined temperature 77° C. (T1U) at time t4, the flow rate of the pump 60 is started to be increased and the increase is continued until time t5 at which the temperature T1 becomes smaller than the predetermined temperature 77° C. (T1U) (S102, S104).

Next, since the temperature difference ΔT becomes equal to or smaller than the predetermined temperature 7° C. (ΔTL) at time t6, the flow rate of the pump 66 is started to be decreased (S210, S212).

Next, since the temperature of the engine cooling water T1 becomes equal to or greater than the predetermined temperature 7° C. (ΔTL) at time t7, the flow rate decrease of the pump 66 is terminated. More precisely, since the flow rate of the pump 66 reached the rated minimum flow rate prior to time t7, the state of the pump 66 is maintained at that time prior to time t7 (S218, S220).

Further, since the temperature of the engine cooling water T1 becomes equal to or smaller than the predetermined temperature 73° C. (T1L) at time t7, the flow rate of the pump 60 is started to be decreased (S106, S108).

Returning to the explanation of the FIG. 2 flowchart, the program next proceeds to S26, in which the temperature of the tap water T5 flowing the third channel portion 54c of the secondary flow channel 54 is detected from the output of the temperature sensor 80, and to S28, in which it is determined whether the detected tap water temperature T5 is greater than a predetermined temperature T5ON (e.g., 65° C.).

When the result in S28 is negative, the processing is suspended until the result becomes affirmative and if it does, the program proceeds to S30, in which the valve member of the flow switching valve 72 is switched to the second position such that the tap water flows from the first channel portion 54a to the second channel portion 54b through the hot water tank 70. With this, supply of the tap water heated by the heat exchanger 30 to the tank 70 is started.

To be more specific, the tap water heated by the heat exchanger 30 is not supplied to the hot water tank 70 for a time being until the temperature of the tap water T5 reaches the predetermined temperature T5ON, but is circulated among the first channel portion 54a, the third channel portion 54b and the second channel portion 54c by the time.

Then, when the temperature of the tap water T5 reaches the predetermined temperature T5ON, the valve member position of the flow switching valve 72 is changed and the tap water is lead to the hot water tank 70 from the first channel portion 54a.

In the flowchart, the program next proceeds to S32, in which it is determined whether the operation of the boiler 82 is stopped. The determination in S32 is done by monitoring the outputs of the temperature sensors 76 and 78. The boiler controller 90 discontinues ignition of the gas to stop the boiler 82 when the temperature of the tap water T6 outputted from the boiler 82 reaches a preset temperature, When the result in S32 is negative, the program is immediately terminated. On the other hand, when the result in S32 is affirmative, the program proceeds to S34, in which it is determined whether the operation of the power generation unit 26 should be stopped.

Specifically, the determination to stop/continue the operation of the power generation unit 26 is made based on the temperature of the tap water T4 detected by the temperature sensor 78. More specifically, based on the temperature T4, it is determined whether the tap water in the hot water tank 70 is boiled up and if it is, the operation of the power generation unit 26 is determined to be stopped.

When the result in S34 is negative, the processing is suspended until the result becomes affirmative, and if it does, the program proceeds to S36, in which the power generation unit 26 is stopped by stopping the operation of the engine 22 and the generator 20.

The program then proceeds to S38, in which it is determined whether the temperature of the engine cooling water T1 is equal to or smaller than a predetermined temperature T1ST. When the result is negative, the processing is suspended until the result becomes affirmative and if it does, the program proceeds to S40, in which the pumps 60, 66 are both stopped.

In other words, the operation of the pumps 60, 66 is continued after the generation unit 26 was stopped until the temperature of the engine cooling water T1 becomes equal to or smaller than the predetermined temperature T1ST.

The predetermined temperature T1ST is set to a value that enables to prevent the power generation unit 26 from being heated or cooled excessively and to make the amount of heat exchange optimum. Specifically, it is set to be a value corresponding to a difference, for example, obtained by subtracting a tolerance from the desired temperature of the engine cooling water.

Figure 7:
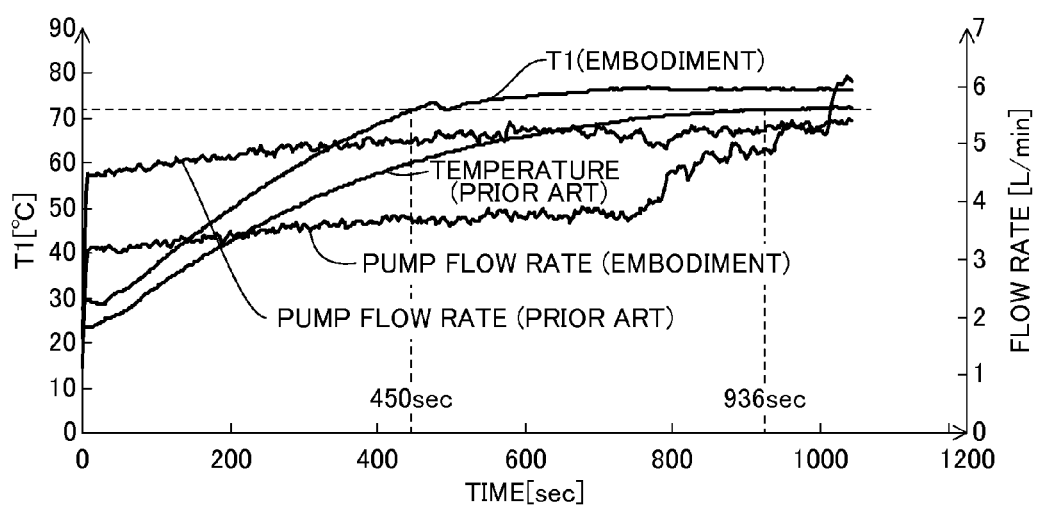
FIG. 7 is a time chart showing operation of the pump flow rate control in the embodiment in contrast with that in the prior art.

FIG. 7 is a time chart showing operation of the pump flow rate control in the embodiment in contrast with that in the prior art.

As shown in the figure, in the prior art where no variable pump flow rate control is conducted, the flow rate of a pump (corresponding to the pump 60 in the embodiment) is greater than that in the embodiment from the starting of the pump. In the prior art, it took approximately 936 seconds until a temperature of the engine cooling water (corresponding to T1) reached a second-pump-start temperature (corresponding to the temperature T1S; S20, S22) for operating a second pump (corresponding to the pump 66 in the embodiment).

On the contrary, in the embodiment, since the flow rate of the pump 60 is smaller than that in the prior art from the starting of the pump 60, it took only 450 seconds until the temperature T1 reached the temperature T1S. With this, it becomes possible to shorten the warm-up time period of the engine 22 markedly.

As stated above, the embodiment is configured to have a cogeneration apparatus (10) (or method for controlling operation thereof) having a power generation unit (26) equipped with a power generator (20) adapted to be connected to an AC power feed line (16) at a location between a commercial power network (12) and an electric load (14), an internal combustion engine (22) adapted to drive the generator, and a hot water tank (70) connected to the engine through a heat exchanger (30), characterized by: a (first) pump (60) provided at a first (primary) flow channel (50) connecting the engine (22) to the heat exchanger (30), and adapted to force an engine cooling water heated by the engine to flow to the heat exchanger (30) and to force the engine cooling water cooled by the heat exchanger (30) to flow to the engine (22) through the first flow channel (50); a first temperature sensor (56) adapted to produce an output indicative of a temperature of the engine cooling water heated by the engine (T1); and a controller (power generation controller 24, S24, S100-S118) adapted to control a flow rate of the first pump based on the detected temperature of the engine cooling water (T1) detected by the first temperature sensor (56).

With this, since the apparatus 10 is configured such that the flow rate of the pump 60 is controlled based on the temperature of the engine cooling water T1 heated by the engine 22, when a part or constituent of the apparatus 10 such as the boiler 82, the hot water tank 70, etc., is to be changed for some reasons, it becomes possible to keep the temperature of the engine cooling water T1 within the proper range without resetting the flow rate of the pump in a simple configuration. In addition, it becomes possible to shorten a time period to warm-up the engine 22.

In the apparatus (and method), the controller is adapted to control the flow rate of the first pump based on the detected temperature of the engine cooling water (T1) detected by the first temperature sensor (56) in such a manner that the flow rate is increased when the detected temperature of the engine cooling water (T1) is equal to or greater than a predetermined first temperature (T1U), while the flow rate is decreased when the detected temperature of the engine cooling water (T1) is equal to or smaller than a predetermined second temperature (T1L; S24, S102-S108).

With this, in addition to the effects and advantages, it becomes possible to keep the temperature of the engine cooling water T1 within the proper range more appropriately and to further shorten the engine warm-up time period.

The apparatus (and method) further includes: a second pump (66) provided at a second (secondary) flow channel (54) connecting the heat exchanger (30) to the hot water tank (70), and adapted to force a tap water from the hot water tank (70) to flow to the heat exchanger (30) and to force the tap water heated by the heat exchanger (30) to flow to the hot water tank (70) through the second flow channel (54); a second temperature sensor (58) adapted to produce an output indicative of a temperature of the engine cooling water cooled by the heat exchanger (T2) and flowing to the engine (22) through the first flow channel (50); a temperature difference determiner (power generation controller 24, S24, S202) that determines a temperature difference ($\Delta T$) between the detected temperature of the engine cooling water (T1) detected by the first temperature sensor (56) and the detected temperature of the engine cooling water (T2) detected by the second temperature sensor (58); and a second controller (power generation controller 24, S24, S200-S222) adapted to control a flow rate of the second pump based on the determined temperature difference ($\Delta T$).

With this, the apparatus 10 is configured such that the temperature of the engine cooling water heated by the engine 22 (T1) and the temperature of the engine cooling water heated by the heat exchanger 30 (T2) are detected and the flow rate of the first and second pumps 60, 66 are controlled based on the temperatures of the engine cooling water T1, T2. Accordingly, in addition to the effects and advantages mentioned above, it becomes possible to keep the temperature of the engine cooling water T1 within the proper range more appropriately and to further shorten the engine warm-up time period.

In the apparatus (and method), the second controller is adapted to control the flow rate of the second pump based on the determined temperature difference ($\Delta T$) in such a manner that the flow rate is increased when the determined temperature difference ($\Delta T$) is equal to or greater than a predetermined third temperature ($\Delta TU$), while the flow rate is decreased when the determined temperature difference ($\Delta T$) is equal to or smaller than a predetermined fourth temperature ($\Delta TL$; S206-S212).

With this, in addition to the effects and advantages mentioned above, it becomes possible to keep the temperature of the engine cooling water T1 within the proper range more appropriately and to further shorten the engine warm-up time period.

It should be noted that, instead of a gas engine using gas fuel such as the city gas or LP gas exemplified as the power source of the power generator 20, it can be an engine using gasoline fuel or the like. Further, although the rated output of the power generation unit 26, displacement of the engine 22 and the like are shown by specific values, they are only examples and not limited thereto.

It should also be noted that the desired temperature of the engine cooling water, the tolerances, and the predetermined temperatures T1S, T1U, etc., are expressed as specific values, they are examples and should not be limited thereto.

It should further be noted that, although the AC power outputted from the power source 12 is defined as 100/200 V, when a power source outputs AC power exceeding 100/200 V, the generation unit 26 should naturally output voltage corresponding to that power.

Japanese Patent Application No. 2012-228742 filed on Oct. 16, 2012, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A cogeneration apparatus having a power generation unit equipped with a power generator adapted to be connected to an AC power feed line at a location between a commercial power network and an electric load, an internal combustion engine adapted to drive the generator, and a hot water tank connected to the engine through a heat exchanger, comprising:
   a first pump provided at a first flow channel connecting the engine to the heat exchanger, adapted to force an engine cooling water heated by the engine to flow to the heat exchanger and to force the engine cooling water cooled by the heat exchanger to flow to the engine through the first flow channel, and adapted so that a flow rate of the first pump is continuously changed;
   a first temperature sensor adapted to produce an output indicative of a temperature of the engine cooling water heated by the engine;

a first controller adapted to control the flow rate of the first pump based on the detected temperature of the engine cooling water detected by the first temperature sensor;

a second pump provided at a second flow channel connecting the heat exchanger to the hot water tank, and adapted to force a tap water from the hot water tank to flow to the heat exchanger and to force the tap water heated by the heat exchanger to flow to the hot water tank through the second flow channel;

a second temperature sensor adapted to produce an output indicative of a temperature of the engine cooling water cooled by the heat exchanger and flowing to the engine through the first flow channel;

a temperature difference determiner that determines a temperature difference between the detected temperature of the engine cooling water detected by the first temperature sensor and the detected temperature of the engine cooling water detected by the second temperature sensor; and a second controller adapted to control a flow rate of the second pump based on the determined temperature difference, wherein the first controller is adapted to start an operation of the first pump with the flow rate of the first pump controlled to a rated minimum flow rate, and wherein the second controller is adapted to start an operation of the second pump when the detected temperature of the engine cooling water detected by the first temperature sensor is equal to or greater than a predetermined fifth temperature after the operation of the first pump is started, and to control the flow rate of the second pump based on the determined temperature difference in such a manner that the flow rate is increased when the determined temperature difference is equal to or greater than a predetermined third temperature, while the flow rate is decreased when the determined temperature difference is equal to or smaller than a predetermined fourth temperature after starting the operation of the second pump.

2. The apparatus according to claim 1, wherein the first controller is adapted to control the flow rate of the first pump based on the detected temperature of the engine cooling water detected by the first temperature sensor in such a manner that the flow rate is increased when the detected temperature of the engine cooling water is equal to or greater than a predetermined first temperature, while the flow rate is decreased when the detected temperature of the engine cooling water is equal to or smaller than a predetermined second temperature.

3. A cogeneration apparatus having a power generation unit equipped with a power generator adapted to be connected to an AC power feed line at a location between a commercial power network and an electric load, an internal combustion engine adapted to drive the generator, and a hot water tank connected to the engine through a heat exchanger, comprising:

a first pump provided at a first flow channel connecting the engine to the heat exchanger, and adapted to force an engine cooling water heated by the engine to flow to the heat exchanger and to force the engine cooling water cooled by the heat exchanger to flow to the engine through the first flow channel, and adapted so that a flow rate of the first pump is continuously changed;

a first temperature sensor adapted to produce an output indicative of a temperature of the engine cooling water heated by the engine;

a first controlling means for controlling the flow rate of the first pump based on the detected temperature of the engine cooling water detected by the first temperature sensor;

a second pump provided at a second flow channel connecting the heat exchanger to the hot water tank, and adapted to force a tap water from the hot water tank to flow to the heat exchanger and to force the tap water heated by the heat exchanger to flow to the hot water tank through the second flow channel;

a second temperature sensor adapted to produce an output indicative of a temperature of the engine cooling water cooled by the heat exchanger and flowing to the engine through the first flow channel;

a temperature difference determining means for determining a temperature difference between the detected temperature of the engine cooling water detected by the first temperature sensor and the detected temperature of the engine cooling water detected by the second temperature sensor; and a second controlling means for controlling a flow rate of the second pump based on the determined temperature difference, wherein the first controlling means is adapted to start an operation of the first pump with the flow rate of the first pump controlled to a rated minimum flow rate, and wherein the second controlling means is adapted to start an operation of the second pump when the detected temperature of the engine cooling water detected by the first temperature sensor is equal to or greater than a predetermined fifth temperature after the operation of the first pump is started, and controls the flow rate of the second pump based on the determined temperature difference in such a manner that the flow rate is increased when the determined temperature difference is equal to or greater than a predetermined third temperature, while the flow rate is decreased when the determined temperature difference is equal to or smaller than a predetermined fourth temperature after starting the operation of the second pump.

4. The apparatus according to claim 3, wherein the first controlling means controls the flow rate of the first pump based on the detected temperature of the engine cooling water detected by the first temperature sensor in such a manner that the flow rate is increased when the detected temperature of the engine cooling water is equal to or greater than a predetermined first temperature, while the flow rate is decreased when the detected temperature of the engine cooling water is equal to or smaller than a predetermined second temperature.

5. A cogeneration apparatus having a power generation unit equipped with a power generator adapted to be connected to an AC power feed line at a location between a commercial power network and an electric load, an internal combustion engine adapted to drive the generator, and a hot water tank connected to the engine through a heat exchanger, comprising:

a first pump provided at a first flow channel connecting the engine to the heat exchanger, adapted to force an engine cooling water heated by the engine to flow to the heat exchanger and to force the engine cooling water cooled by the heat exchanger to flow to the engine through the first flow channel, and adapted so that a flow rate of the first pump is continuously changed;

a first temperature sensor adapted to produce an output indicative of a temperature of the engine cooling water heated by the engine;

a first controller adapted to control the flow rate of the first pump based on the detected temperature of the engine cooling water detected by the first temperature sensor;

a second pump provided at a second flow channel connecting the heat exchanger to the hot water tank, and adapted to force a tap water from the hot water tank to flow to the heat exchanger and to force the tap water heated by the heat exchanger to flow to the hot water tank through the second flow channel;

a second temperature sensor adapted to produce an output indicative of a temperature of the engine cooling water cooled by the heat exchanger and flowing to the engine through the first flow channel;

a temperature difference determiner that determines a temperature difference between the detected temperature of the engine cooling water detected by the first temperature sensor and the detected temperature of the engine cooling water detected by the second temperature sensor; and a second controller adapted to control a flow rate of the second pump based on the determined temperature difference, wherein the second controller is adapted to control the flow rate of the second pump based on the determined temperature difference in such a manner that the flow rate is increased when the determined temperature difference is equal to or greater than a predetermined third temperature, while the flow rate is decreased when the determined temperature difference is equal to or smaller than a predetermined fourth temperature, and wherein the second flow channel comprises:

a channel portion bypassing the hot water tank;

a third temperature sensor adapted to produce an output indicative of a temperature of the tap water flowing through the channel portion; and a flow switching valve adapted to switch a flow of the tap water in such a manner that the tap water flows bypassing the hot water tank through the channel portion when the detected temperature of the tap water detected by the third temperature sensor is smaller than a predetermined sixth temperature, while the tap water flows through the hot water tank when the detected temperature of the tap water is equal to or greater than the predetermined sixth temperature.

6. The apparatus according to claim 5, wherein the first controller is adapted to control the flow rate of the first pump based on the detected temperature of the engine cooling water detected by the first temperature sensor in such a manner that the flow rate is increased when the detected temperature of the engine cooling water is equal to or greater than a predetermined first temperature, while the flow rate is decreased when the detected temperature of the engine cooling water is equal to or smaller than a predetermined second temperature.

7. A cogeneration apparatus having a power generation unit equipped with a power generator adapted to be connected to an AC power feed line at a location between a commercial power network and an electric load, an internal combustion engine adapted to drive the generator, and a hot water tank connected to the engine through a heat exchanger, comprising:

a first pump provided at a first flow channel connecting the engine to the heat exchanger, adapted to force an engine cooling water heated by the engine to flow to the heat exchanger and to force the engine cooling water cooled by the heat exchanger to flow to the engine through the first flow channel, and adapted so that a flow rate of the first pump is continuously changed;

a first temperature sensor adapted to produce an output indicative of a temperature of the engine cooling water heated by the engine;

a first controlling means for controlling the flow rate of the first pump based on the detected temperature of the engine cooling water detected by the first temperature sensor;

a second pump provided at a second flow channel connecting the heat exchanger to the hot water tank, and adapted to force a tap water from the hot water tank to flow to the heat exchanger and to force the tap water heated by the heat exchanger to flow to the hot water tank through the second flow channel;

a second temperature sensor adapted to produce an output indicative of a temperature of the engine cooling water cooled by the heat exchanger and flowing to the engine through the first flow channel;

a temperature difference determining means for determining a temperature difference between the detected temperature of the engine cooling water detected by the first temperature sensor and the detected temperature of the engine cooling water detected by the second temperature sensor; and a second controlling means for controlling a flow rate of the second pump based on the determined temperature difference, wherein the second controlling means controls the flow rate of the second pump based on the determined temperature difference in such a manner that the flow rate is increased when the determined temperature difference is equal to or greater than a predetermined third temperature, while the flow rate is decreased when the determined temperature difference is equal to or smaller than a predetermined fourth temperature, and wherein the second flow channel comprises:

a channel portion bypassing the hot water tank;

a third temperature sensor adapted to produce an output indicative of a temperature of the tap water flowing through the channel portion; and a flow switching valve adapted to switch a flow of the tap water in such a manner that the tap water flows bypassing the hot water tank through the channel portion when the detected temperature of the tap water detected by the third temperature sensor is smaller than a predetermined sixth temperature, while the tap water flows through the hot water tank when the detected temperature of the tap water is equal to or greater than the predetermined sixth temperature.

8. The apparatus according to claim 7, wherein the first controlling means controls the flow rate of the first pump based on the detected temperature of the engine cooling water detected by the first temperature sensor in such a manner that the flow rate is increased when the detected temperature of the engine cooling water is equal to or greater than a predetermined first temperature, while the flow rate is decreased when the detected temperature of the engine cooling water is equal to or smaller than a predetermined second temperature.

\* \* \* \* \*